United States Patent
Fujiwara

(10) Patent No.: US 10,586,515 B2
(45) Date of Patent: Mar. 10, 2020

(54) METHOD AND APPARATUS FOR CONCURRENTLY DISPLAYING IMAGES REPRESENTING OPERATING SYSTEM DATA AND NON-OPERATING SYSTEM DATA

(71) Applicant: Panasonic Intellectual Property Management Co., Ltd., Osaka (JP)

(72) Inventor: Kazunari Fujiwara, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 29 days.

(21) Appl. No.: 15/685,476

(22) Filed: Aug. 24, 2017

(65) Prior Publication Data
US 2017/0352331 A1    Dec. 7, 2017

Related U.S. Application Data

(63) Continuation of application No. PCT/JP2016/001040, filed on Feb. 26, 2016.

(30) Foreign Application Priority Data

Mar. 13, 2015  (JP) .................................. 2015-051155

(51) Int. Cl.
*G09G 5/377*  (2006.01)
*G09G 5/38*  (2006.01)
(Continued)

(52) U.S. Cl.
CPC ............... *G09G 5/377* (2013.01); *G09G 5/14* (2013.01); *G09G 5/38* (2013.01); *H04N 5/265* (2013.01);
(Continued)

(58) Field of Classification Search
None
See application file for complete search history.

(56) References Cited

U.S. PATENT DOCUMENTS 5,617,528 A * 4/1997 Stechmann ............ G06K 1/121
358/540
5,621,428 A    4/1997 King et al.
(Continued)

FOREIGN PATENT DOCUMENTS

JP          10-307697          11/1998

OTHER PUBLICATIONS

International Search Report of PCT application No. PCT/JP2016/001040 dated May 31, 2016.
(Continued)

*Primary Examiner* — Kee M Tung
*Assistant Examiner* — Patrick F Valdez
(74) *Attorney, Agent, or Firm* — Renner, Otto, Boisselle & Sklar, LLP

(57) ABSTRACT

An electronic device includes controller that generates, as a first image, an image in which a second display object is disposed in a region that is on a layer lower than a topmost layer and that is identical to a display region of a second image of a synthetic image while image superimposing unit is outputting synthetic image signal to display, monitors a change in color of an image within the region where the second display object is disposed in the first image, and changes a display form of the synthetic image upon detection of the change in color.

13 Claims, 8 Drawing Sheets

(51) Int. Cl.
*H04N 5/265* (2006.01)
*G09G 5/14* (2006.01)
*H04N 9/04* (2006.01)
*G09G 5/00* (2006.01)

(52) U.S. Cl.
CPC ............. *H04N 9/04* (2013.01); *G09G 5/003* (2013.01); *G09G 2340/12* (2013.01)

(56) References Cited

U.S. PATENT DOCUMENTS

| | | | |
|---|---|---|---|
| 5,896,131 A | 4/1999 | Alexander | |
| 6,320,577 B1 | 11/2001 | Alexander | |
| 7,623,140 B1* | 11/2009 | Yeh | G06T 15/503 345/522 |
| 2002/0113807 A1 | 8/2002 | Nason et al. | |
| 2002/0147389 A1* | 10/2002 | Cavallaro | A61B 5/044 600/301 |
| 2007/0101290 A1* | 5/2007 | Nakashima | G01C 21/265 715/797 |
| 2016/0093071 A1* | 3/2016 | Miki | G09G 5/14 345/589 |

OTHER PUBLICATIONS

The Extended European Search Report dated Feb. 2, 2018 for the related European Patent Application No. 16764409.5.

* cited by examiner

METHOD AND APPARATUS FOR CONCURRENTLY DISPLAYING IMAGES REPRESENTING OPERATING SYSTEM DATA AND NON-OPERATING SYSTEM DATA

BACKGROUND

1. Technical Field

The present disclosure relates to an electronic device having a display that is capable of displaying an image and a method for controlling the electronic device.

2. Description of the Related Art

Patent Literature 1 discloses a display device (oscilloscope) having a display that is capable of displaying an image. Upon receipt of an image signal indicating a second image having a predetermined color during display of a first image on the display, the display device described in Patent Literature 1 is capable of displaying, on the display, an image obtained by superimposing the second image that has been, for example, made semi-transparent on the first image.

CITATION LIST

Patent Literature

PTL 1: Unexamined Japanese Patent Publication No. H10-307697 (1998)

SUMMARY

The present disclosure provides an electronic device that allows a user to recognize that an object such as a warning window has been displayed, for example, by an OS in an electronic device such as a computer when a second image is displayed on a higher-layer side of a first image generated under control of the OS so as to be superimposed on the first image outside control of the OS.

An electronic device according to the present disclosure includes a display that displays an image based on an input image signal, and a controller that generates a first image signal indicating a first image under control of an operating system. Furthermore, the electronic device includes an image superimposing unit that receives the first image signal and a second image signal indicating a second image, generates a synthetic image in which the second image is disposed on a higher-layer side of the first image outside control of the operating system, and then outputs a synthetic image signal indicating the generated synthetic image to the display. The controller generates, as the first image, an image in which a display object is disposed in a hierarchical way and upon occurrence of a predetermined event, disposes, in a topmost layer, a first display object indicating the occurrence of the predetermined event. While the image superimposing unit is outputting the synthetic image signal to the display, the controller generates, as the first image, an image in which a second display object is disposed in a region that is on a layer lower than the topmost layer and that is identical to a display region of the second image of the synthetic image, monitors a change in color of an image within the region where the second display object is disposed in the first image, and upon detection of the change in color, changes a display form of the synthetic image.

In this way, a change in color of an image within a predetermined region where the second display object is disposed in the first image is monitored while a synthetic image in which the second image is disposed on a higher-layer side of the first image is being generated outside control of the operating system. When the first display object is generated, the color of the image within the predetermined region changes. Accordingly, the change in color is detected. As a result, a display form of the synthetic image is changed so that a user can recognize occurrence of a predetermined event. This allows the user to recognize occurrence of the predetermined event.

DETAILED DESCRIPTION

Exemplary embodiments are described in detail below with reference to the drawings as appropriate. Note, however, that too detailed description is sometimes omitted. For example, detailed description about a well-known matter and repeated description about a substantially identical element are sometimes omitted. This is to avoid too redundant description and promote easy understanding of a person skilled in the art.

Note that the attached drawings and the following description are provided for those skilled in the art to fully understand the present disclosure, and are not intended to limit the subject matter as described in the appended claims.

BACKGROUND TO DISCLOSURE

In an electronic device such as a computer, a display object such as a window is typically displayed under control of an operating system (OS).

In an electronic device such as a computer, there are cases where an image signal is input via an external input terminal, and an image indicated by the input image signal is displayed on a display so as to be superimposed on a desktop. In such cases, the electronic device displays the input image on the display after causing a central processing unit (CPU) to perform predetermined processing on the input image.

In some cases, processing capability of the CPU becomes insufficient because an amount of data to be processed increases as the resolution of the external input image increases. One method for dealing with this is to provide a graphics processing unit (GPU) for image processing separately from the CPU so that an input image is superimposed (disposed) on a higher-layer side of a first image output from the CPU outside control of the OS. However, a display object such as a warning window generated under control of the OS is sometimes hidden by the second image superimposed on the higher-layer side.

The present disclosure makes it possible for a user to recognize that an object such as a warning window has been displayed, for example, by an OS in an electronic device such as a computer when a second image is displayed on a higher-layer side of a first image generated under control of the OS so as to be superimposed on the first image outside control of the OS.

First Exemplary Embodiment

A first exemplary embodiment is described below with reference to the drawings.

1-1. Configuration

Figure 1:
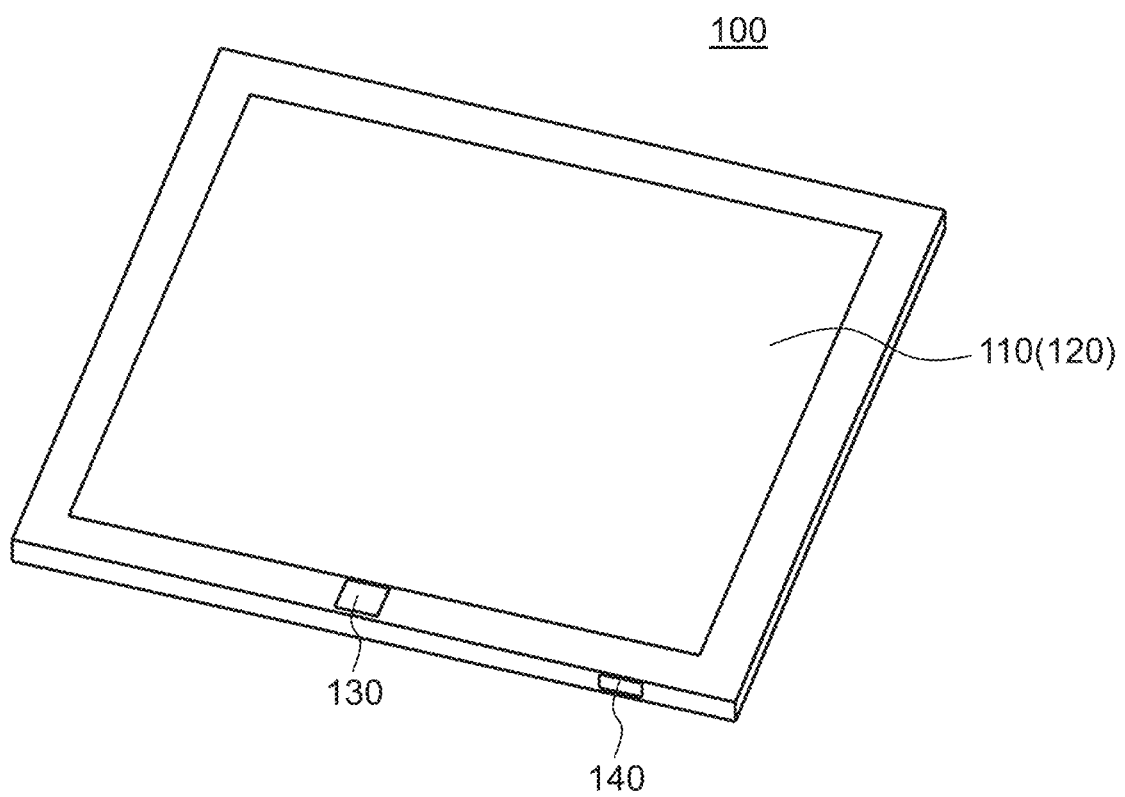
FIG. 1 illustrates an external appearance of an electronic device according to a first exemplary embodiment.

FIG. 1 illustrates an external appearance of electronic device 100 according to the first exemplary embodiment.

Electronic device 100 is a tablet computer.

Electronic device 100 includes display 110, touch panel 120, operation button 130, and external input terminal 140.

Display 110 displays an image on the basis of an input image signal. Display 110 is, for example, a liquid crystal display. Display 110 is a so-called 4 k display having 3840 pixels in a horizontal direction and 2160 pixels in a vertical direction. Accordingly, display 110 is capable of displaying a 4 k image (an image having 3840 pixels in a horizontal direction and 2160 pixels in a vertical direction) while keeping the original resolution.

Touch panel 120 is provided on a surface of display 110. Touch panel 120 is a pointing device that outputs a signal indicating a touched position.

Operation button 130 is a press-down button and outputs a signal indicating pressing down when operation button 130 is pressed down.

External input terminal 140 receives a signal that is output from an external device. External input terminal 140 is, for example, a high-definition multimedia interface (an HDMI, Registered Trademark) terminal.

Figure 2:
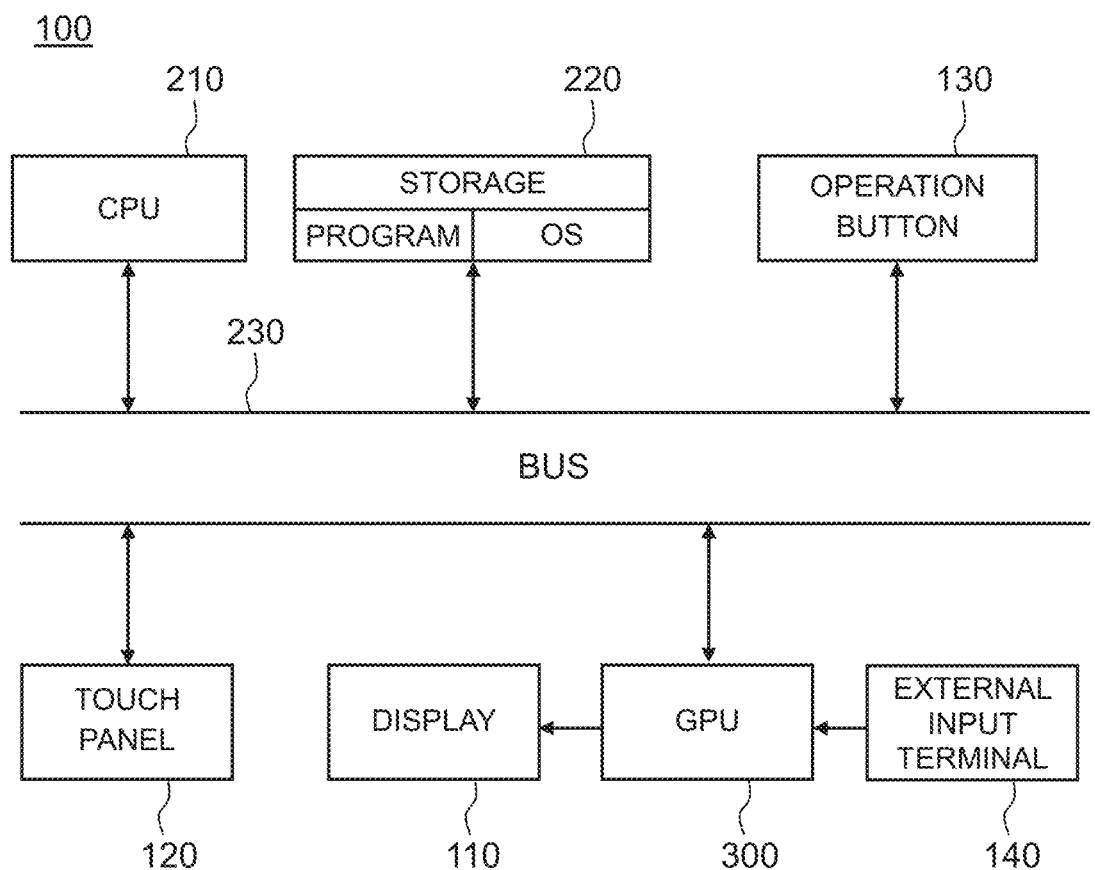
FIG. 2 is a block diagram illustrating an electric configuration of the electronic device according to the first exemplary embodiment.

FIG. 2 is a block diagram illustrating an electric configuration of electronic device 100 according to the first exemplary embodiment.

Electronic device 100 further includes central processing unit (a CPU) 210, storage 220, bus 230, and graphics processing unit (a GPU) 300.

Storage 220 temporarily or permanently stores therein data necessary for information processing performed by electronic device 100. Storage 220 stores therein, for example, a program and data referred to by the program. Storage 220 is, for example, a volatile memory, a non-volatile memory, or a hard disc drive (an HDD). Storage 220 stores therein an operating system (an OS). The OS offers a user a system for handling constituent elements of electronic device 100 in a software manner. Storage 220 stores therein programs for performing various kinds of processing that will be described later.

CPU 210 controls overall operation of electronic device 100. CPU 210 reads out the OS and a program from storage 220. CPU 210 realizes various functions of electronic device 100 by arithmetic processing based on the OS and program thus read out. CPU 210 has a function of generating an image signal indicating an image to be displayed on display 110 on the basis of the OS and program. CPU 210 performs predetermined processing on the basis of the OS and program upon receipt of a signal from touch panel 120 or operation button 130.

Bus 230 is a signal path through which each constituent element constituting electronic device 100 transmits and receives various signals to and from another constituent element. Touch panel 120, operation button 130, CPU 210, storage 220, and GPU 300 are connected to bus 230.

GPU 300 is a large-scale integration (LSI) circuit that is capable of performing image processing on a 4 k image. GPU 300 is provided to lessen a processing load on CPU 210 during image processing of a 4 k image having a large number of pixels. GPU 300 receives a first image signal generated by CPU 210 and a second image signal input via external input terminal 140, generates a synthetic image by disposing the second image on a higher-layer side of the first image outside control of the operating system, and then outputs a synthetic image signal indicating the generated synthetic image to display 110. GPU 300 outputs the first image signal generated by CPU 210 to display 110 as it is while no external image signal is input from external input terminal 140.

1-2. Operation

Operation of electronic device 100 according to the first exemplary embodiment is described below.

1-2-1. Overview

Figure 3:
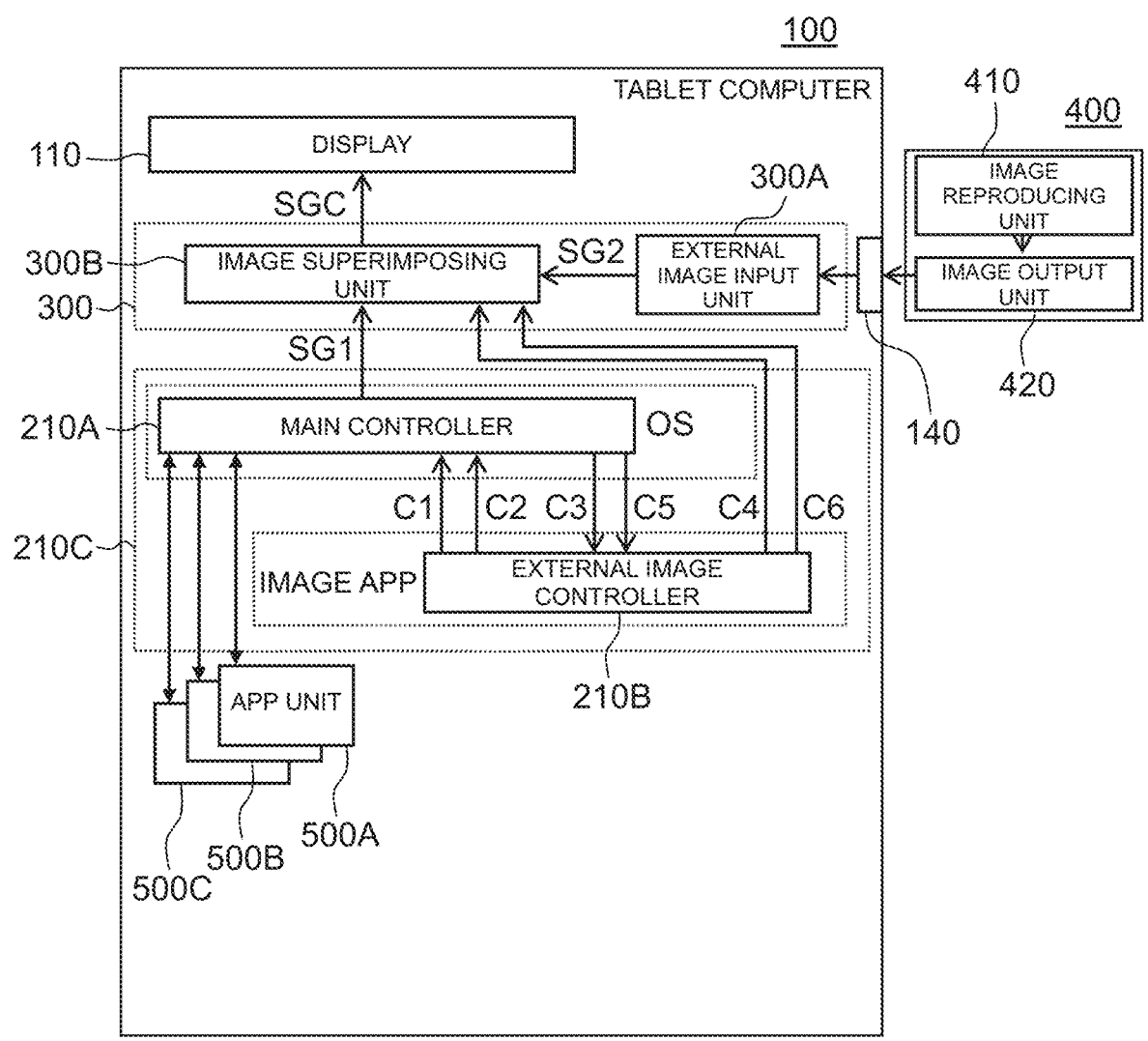
FIG. 3 is a functional block diagram illustrating functions of the electronic device according to the first exemplary embodiment.

FIG. 3 is a functional block diagram illustrating functions of electronic device 100 according to the first exemplary embodiment.

In controller 210C, the OS and an image application are executed by CPU 210. Controller 210C includes main controller 210A (a first controller) and external image controller 210B (a second controller).

In main controller 210A (the first controller), the OS is executed by CPU 210. Main controller 210A collectively controls the operation of electronic device 100. Furthermore, main controller 210A generates first image signal SG1 under control of the OS and outputs generated first image signal SG1.

In external image controller 210B, the image application is executed on the OS by CPU 210. External image controller 210B exchanges various signals with main controller 210A and controls external image input unit 300A and image superimposing unit 300B of GPU 300 on the basis of the exchanged signals.

Various applications such as a music management application, a spreadsheet application, and a document preparation application are executable on the OS in addition to the image application. In FIG. 3, in application units (hereinafter abbreviated as app units) 500A, 500B, and 500C, such applications are executed on the OS by CPU 210.

GPU 300 includes external image input unit 300A and image superimposing unit 300B.

External image input unit 300A converts an image signal that is input from external image device 400 via external input terminal 140 into an image signal of a format processable in image superimposing unit 300B. The image signal output by external image input unit 300A is second image signal SG2. External image device 400 includes, for example, image reproducing unit 410 and image output unit 420 and outputs a 4K image signal indicating a 4K image reproduced by image reproducing unit 410 from image output unit 420.

Image superimposing unit 300B receives first image signal SG1 and second image signal SG2 indicating a second image. Image superimposing unit 300B generates a synthetic image obtained by disposing the second image on a higher-layer side of the first image. Image superimposing unit 300B outputs synthetic image signal SOC indicating the generated synthetic image to display 110.

Figure 4:
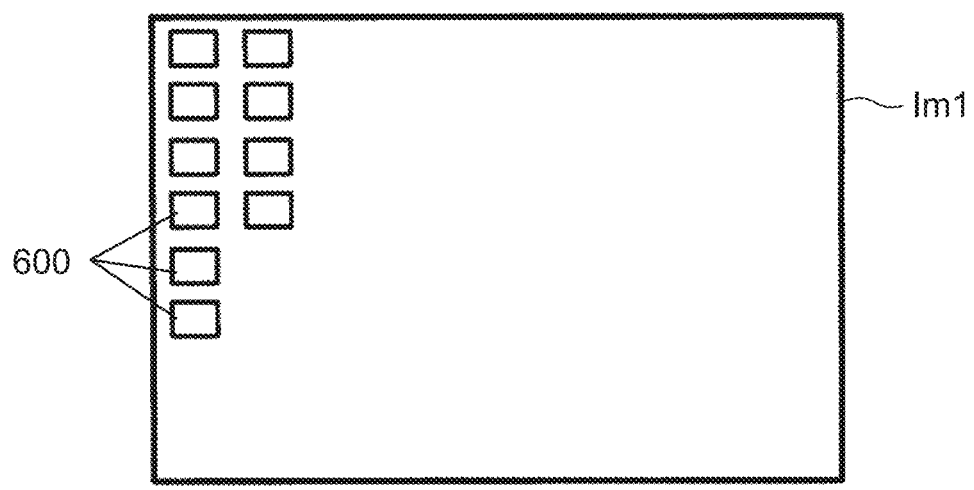
FIG. 4 illustrates an example of a first image on a display screen of the electronic device according to the first exemplary embodiment.
Figure 5:
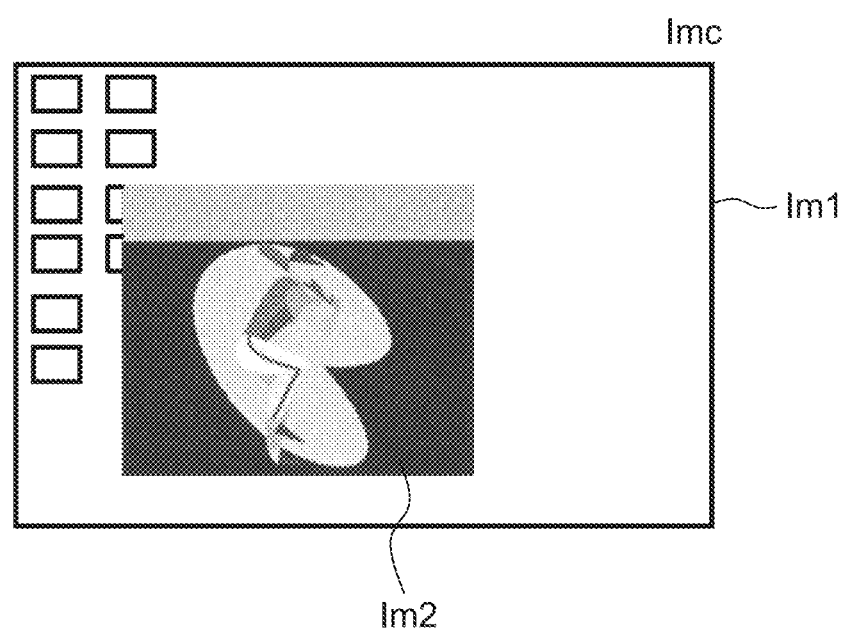
FIG. 5 illustrates an example of a synthetic image obtained by disposing (superimposing) a second image on a higher-layer side of a first image on the display screen of the electronic device according to the first exemplary embodiment.

FIG. 4 illustrates an example of a first image on a display screen of electronic device 100 according to the first exemplary embodiment. In this example, a plurality of icons 600 is disposed on a desktop. FIG. 5 illustrates an example of a synthetic image obtained by disposing (superimposing) a second image on a higher-layer side of a first image on the display screen of electronic device 100 according to the first exemplary embodiment.

Image superimposing unit 300B synthesizes, on a higher-layer side of first image Im1 generated by the OS, second image Im2 outside control of the OS as described above. Accordingly, when the second image Im2 is synthesized with the first image Im1 illustrated in FIG. 4 by image superimposing unit 300B, synthetic image Imc in which the second image Im2 is synthesized on a higher-layer side of the first image Im1 is generated as illustrated in FIG. 5.

The OS manages display objects such as a window in a hierarchical manner. The OS generates an image in which the managed display objects such as a window are disposed (superimposed) in a hierarchical order and outputs first image signal SG1 indicating generated first image Im1.

The OS generates a first display object upon occurrence of a predetermined event in electronic device 100 and then disposes the first display object in a topmost layer that can be managed by the OS. The predetermined event is, for example, occurrence of a state where electronic device 100 should give a predetermined warning. The first display object is, for example, a warning window. The state where a predetermined warning should be given is, for example, a state where a remaining battery level of electronic device 100 is equal to or lower than a predetermined level. The following discusses a case where the predetermined event is a state where a predetermined warning should be given and where the first display object is a warning window.

1-2-2. Problem To Be Solved By Disclosure

Figure 6:
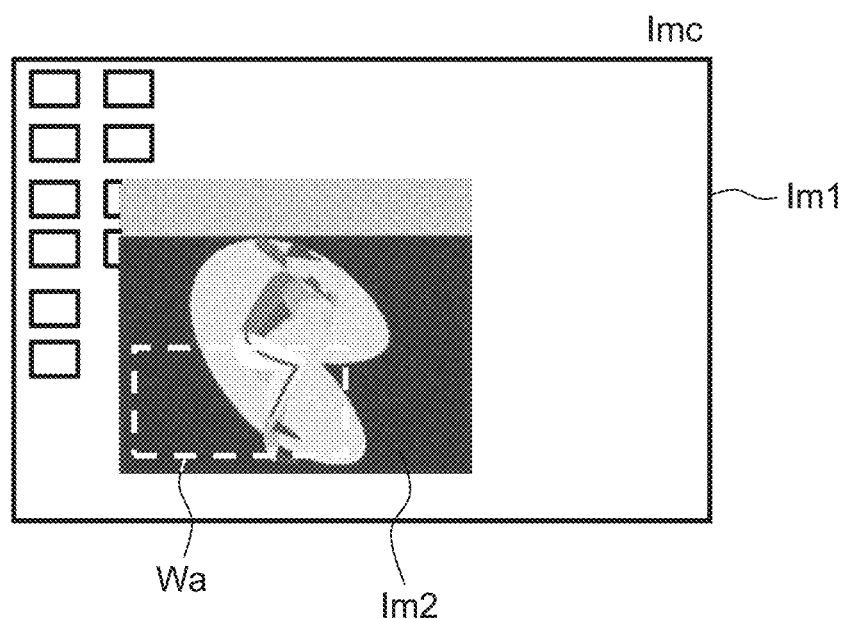
FIG. 6 illustrates a display screen of the electronic device according to the first exemplary embodiment on which a warning window overlaps a portion of the second image.

A problem to be solved by the present disclosure is described below with reference to FIG. 6. FIG. 6 illustrates a display screen of electronic device 100 according to the first exemplary embodiment on which a warning window overlaps a portion of a second image. In the configuration in which image superimposing unit 300B generates synthetic image Imc by synthesizing second image Im2 with first image Im1 on a higher-layer side of first image Im1 outside control of the OS, first image Im1 in which warning window Wa is disposed in a topmost layer is generated by the OS upon occurrence of a state where a predetermined warning should be given during display of synthetic image Imc. However, since image superimposing unit 300B disposes second image Im2 on the higher-layer side of first image Im1 outside control of the OS, warning window Wa is hidden by second image Im2 in synthetic image Imc. This results in a risk of user's failure to recognize occurrence of a state where a predetermined warning should be given. In order to solve this problem, the present exemplary embodiment employs the following configuration.

1-2-3. Configuration for Solving Problem

In the present exemplary embodiment, external image controller 210B detects overlapping of warning window Wa on a portion of second image Im2 of synthetic image Imc. When external image controller 210B detects overlapping, a display form of synthetic image Imc is changed so that a user can recognize occurrence of a predetermined event. This is described in detail below.

1-2-3-1. Disposition of Overlap Detection Window

Figure 7:
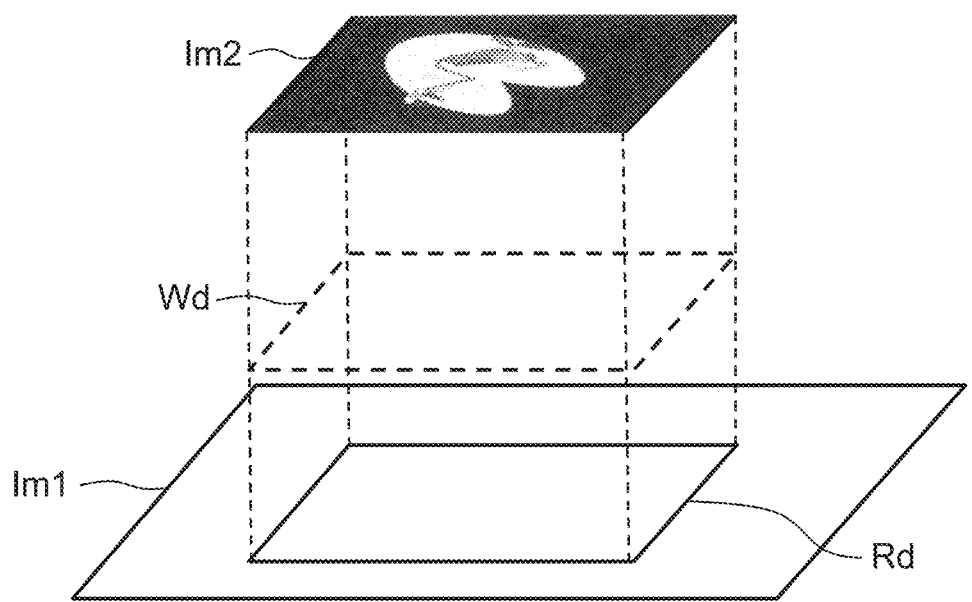
FIG. 7 is a diagram for explaining a hierarchical structure of a synthetic image displayed on the electronic device according to the first exemplary embodiment.
Figure 8:
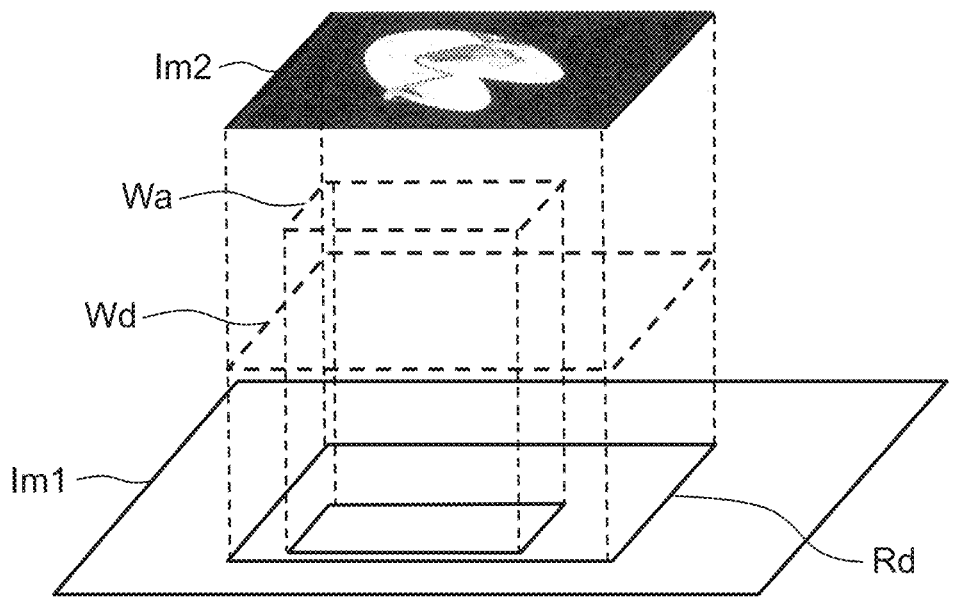
FIG. 8 is a diagram for explaining a hierarchical structure of a synthetic image displayed on the electronic device according to the first exemplary embodiment (during warning display).

FIG. 7 is a diagram for explaining a hierarchical structure of a synthetic image displayed on electronic device 100 according to the first exemplary embodiment. In the present exemplary embodiment, when a synthetic image is generated, overlap detection window Wd (a second display object) is disposed in a layer lower than the topmost layer managed by the OS in overlap detection region Rd identical to a display region of second image Im2 of the synthetic image. Overlap detection window Wd is a window colored in a single color. The single color may be any color. Overlap detection window Wd is disposed under control of the OS in a layer that is one layer below the topmost layer among layers managed by the OS. Accordingly, when a state that a predetermined warning should be given occurs, warning window Wa is disposed in a layer that is higher than overlap detection window Wd as illustrated in FIG. 8. FIG. 8 is a diagram for explaining a hierarchical structure of a synthetic image displayed on electronic device 100 according to the first exemplary embodiment (during warning display).

Processing for generating overlap detection window Wd and processing for superimposing second image Im2 on a higher-layer side of first image are described below with reference to FIG. 3.

Upon activation of an image application by a user, external image controller 210B transmits, to main controller 210A, command (C1) requesting generation of overlap detection window Wd in a layer that is one layer below the topmost layer among the layers managed by the OS. Furthermore, external image controller 210B transmits, to main controller 210A, command (C2) requesting transmission of information on a position where generated overlap detection window Wd is disposed (positional information). The positional information is indicated, for example, by coordinates of upper left and lower right corners of the window.

Main controller 210A generates overlap detection window Wd in a layer that is one layer below the topmost layer among the layers managed by the OS and transmits positional information (C3) of generated overlap detection window Wd to external image controller 210B.

External image controller 210B transmits, to image superimposing unit 300B, positional information (C4) of overlap detection window Wd received from main controller 210A.

Image superimposing unit 300B generates synthetic image Imc by superimposing second image Im2 on first image Im1 at a position corresponding to the positional information of overlap detection window Wd received from external image controller 210B. Image superimposing unit 300B outputs synthetic image signal SGC indicated by generated synthetic image Imc to display 110.

By the above processing, overlap detection window Wd can be generated, and second image Im2 can be disposed in a layer above overlap detection window Wd so as to be superimposed on overlap detection window Wd.

1-2-3-2. Processing for Detecting Overlap and Processing for Changing Display Form of Synthetic Image In the present exemplary embodiment, a display form of synthetic image Imc is changed when external image controller 210B detects that main controller 210A generates warning window Wa at a position overlapping second image Im2. This processing is described below.

Figure 9:
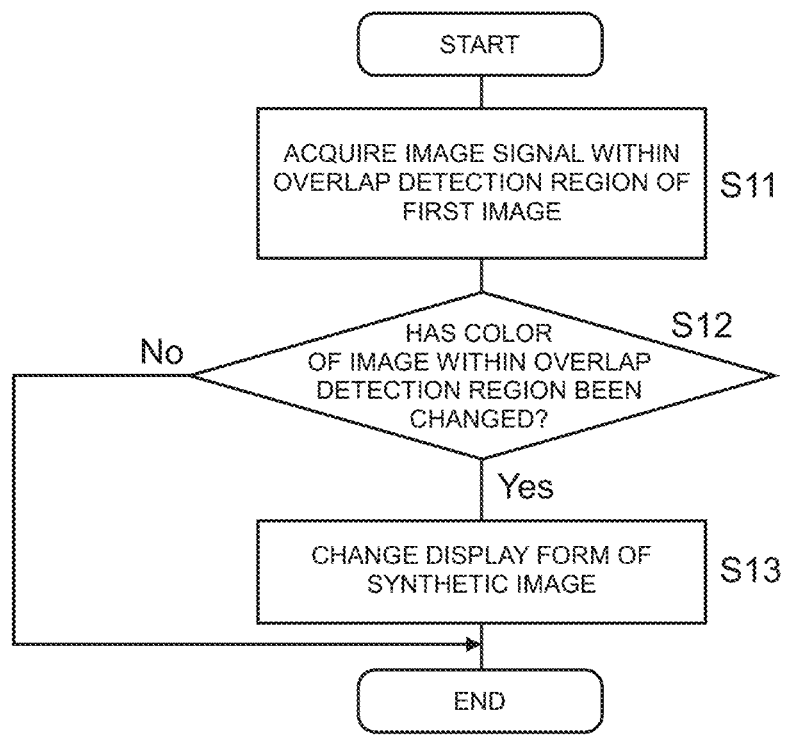
FIG. 9 is a flowchart for explaining an operation for changing a display form of a synthetic image in the electronic device according to the first exemplary embodiment.

FIG. 9 is a flowchart for explaining an operation of changing a display form of a synthetic image in electronic device 100 according to the first exemplary embodiment. The processing illustrated in this flowchart is performed in a predetermined cycle.

First, external image controller 210B acquires, from main controller 210A, an image signal (C5 in FIG. 3) within overlap detection region Rd in first image Im1 indicated by first image signal SG1 (a region in which overlap detection window Wd is disposed in first image Im1) (step S11). When an image application is being executed, main controller 210A outputs an image signal within overlap detection region Rd to external image controller 210B in the predetermined cycle. External image controller 210B may acquire an image signal within overlap detection region Rd by acquiring first image signal SG1 from main controller 210A in the predetermined cycle and then cutting out only the image signal within overlap detection region Rd.

External image controller 210B monitors a change in color of an image indicated by the image signal within overlap detection region Rd in first image Im1 acquired from main controller 210A and thus determines whether the color has changed (step S12). Specifically, overlap detection region Rd is a region corresponding to overlap detection window Wd. Accordingly, when warning window Wa is not disposed on a higher-layer side of overlap detection window Wd, the color of the image indicated by the image signal within overlap detection region Rd is identical to a color of overlap detection window Wd. Meanwhile, when warning window Wa is disposed on a higher-layer side of overlap detection window Wd, the color of the image indicated by the image signal within overlap detection region Rd includes a color that is different from the color of overlap detection window Wd. That is, a color of a part of the image indicated by the image signal within overlap detection region Rd partially changes. More specifically, a color of pixels included in a part where warning window Wa is disposed in overlap detection region Rd changes from the color of overlap detection window Wd. In step S12, a determination is made whether such a change in color of the pixels has occurred. A more specific example of monitoring of a change in color will be described later.

If the color of the image indicated by the image signal within overlap detection region Rd has changed (Yes in step S12), external image controller 210B outputs a command (C6 in FIG. 3) to change a display form of synthetic image Imc to image superimposing unit 300B and/or main controller 210A (step S13). A specific example of change of a display form will be described later.

Meanwhile, if the color of the image indicated by the image signal within overlap detection region Rd has not changed (No in Step S12), external image controller 210B continues to display synthetic image Imc while keeping a current form.

Figure 10:
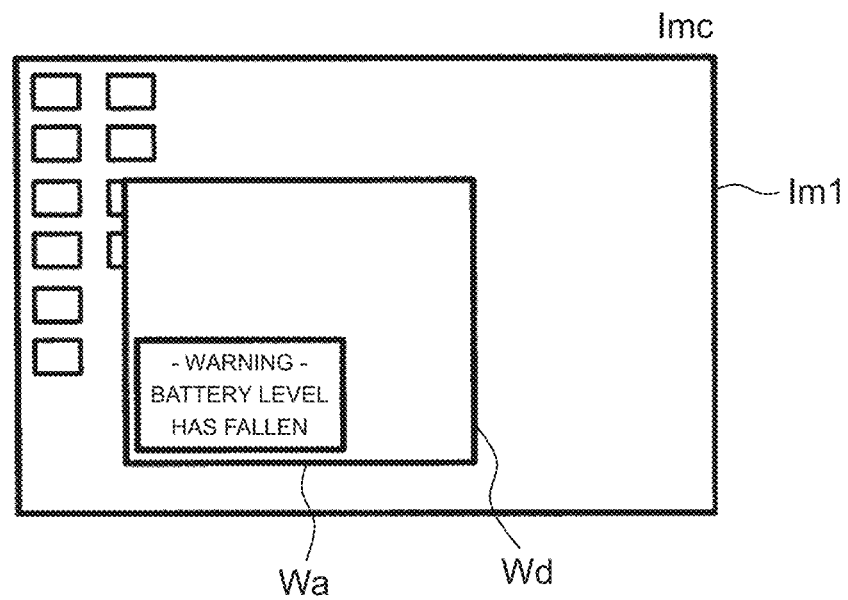
FIG. 10 illustrates a first example of a display screen of the electronic device according to the first exemplary embodiment on which a display form of a synthetic image has been changed.

1-2-4. Example of Change of Display Form 1-2-4-1. First Example of Change of Display Form FIG. 10 illustrates a first example of a display screen of electronic device 100 according to the first exemplary embodiment on which a display form of a synthetic image has been changed. In the first example, controller 210C (external image controller 210B) controls image superimposing unit 300B to stop second image Im2 from being superimposed on first image Im1. Specifically, external image controller 210B gives image superimposing unit 300B the command (C6 in FIG. 3) to stop second image Im2 from being superimposed on first image Im1.

As a result, second image Im2 is not superimposed in synthetic image Imc. This results in a state where overlap detection window Wd and warning window Wa are displayed on the screen, thereby allowing a user to view warning window Wa and thus recognize that a warning has occurred.

In this example, a message indicating a reason why display of the image has been stopped such as "display of the image has been stopped once because important information may have been displayed by OS" may be displayed for a user on overlap detection window Wd. In this example, external image controller 210B may output a command to delete overlap detection window Wd to main controller 210A when outputting command C6 to stop second image Im2 from being superimposed on first image Im1 to image superimposing unit 300B. As a result, overlap detection window Wd is also deleted.

1-2-4-2. Second Example of Change of Display Form

Figure 11:
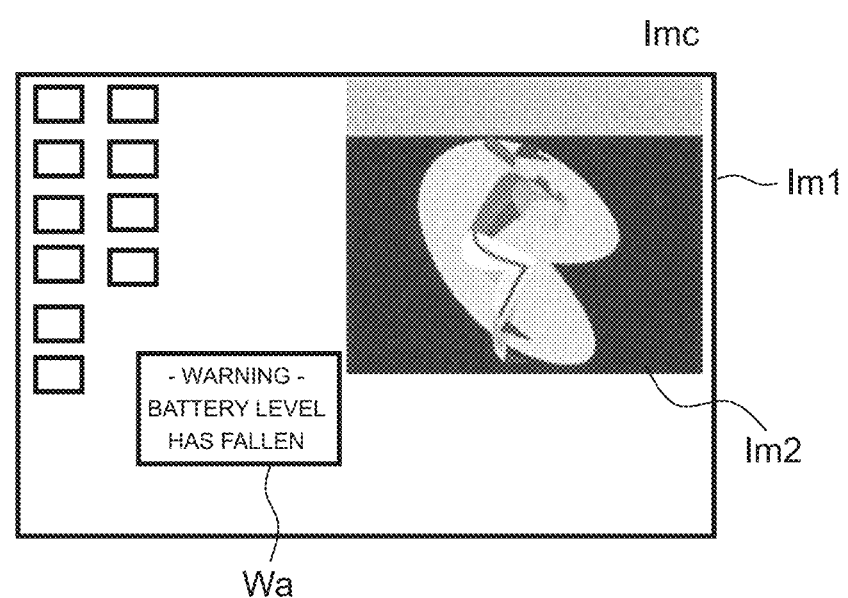
FIG. 11 illustrates a second example of a display screen of the electronic device according to the first exemplary embodiment on which a display form of a synthetic image has been changed.

FIG. 11 illustrates a second example of a display screen of electronic device 100 according to the first exemplary embodiment on which a display form of a synthetic image has been changed. In the second example, external image controller 210B and main controller 210A, i.e., controller 210C changes the position of second image Im2 disposed on a higher-layer side of first image Im1 to a position that does not overlap warning window Wa. Specifically, external image controller 210B finds positions (coordinates) of overlap detection window Wd and second image Im2 that do not overlap warning window Wa. External image controller 210B outputs, to main controller 210A and image superimposing unit 300B, a command to dispose overlap detection window Wd and second image Im2 at the positions thus found. Then, main controller 210A outputs first image signal SG1 indicating first image Im1 in which overlap detection window Wd is disposed at the position based on the command. Image superimposing unit 300B outputs synthetic image signal SGC in which second image Im2 is synthesized at the position based on the command.

In this way, the display position of second image Im2 is changed to a position that does not overlap warning window Wa. This allows a user to view warning window Wa and recognize that a warning has occurred.

In this example, warning window Wa may be moved to a position that does not overlap second image Im2. Alternatively, both of warning window Wa and second image Im2 do be moved so that warning window Wa and second image Im2 do not overlap each other. Alternatively, display sizes of second image Im2 and overlap detection window Wd may be changed so that second image Im2 and overlap detection window Wd do not overlap warning window Wa. These cases make it to obtain an effect similar to the effect obtained in cases where second image Im2 is moved to a position that does not overlap warning window Wa.

1-2-4-3. Third Example Of Change of Display Form

Figure 12:
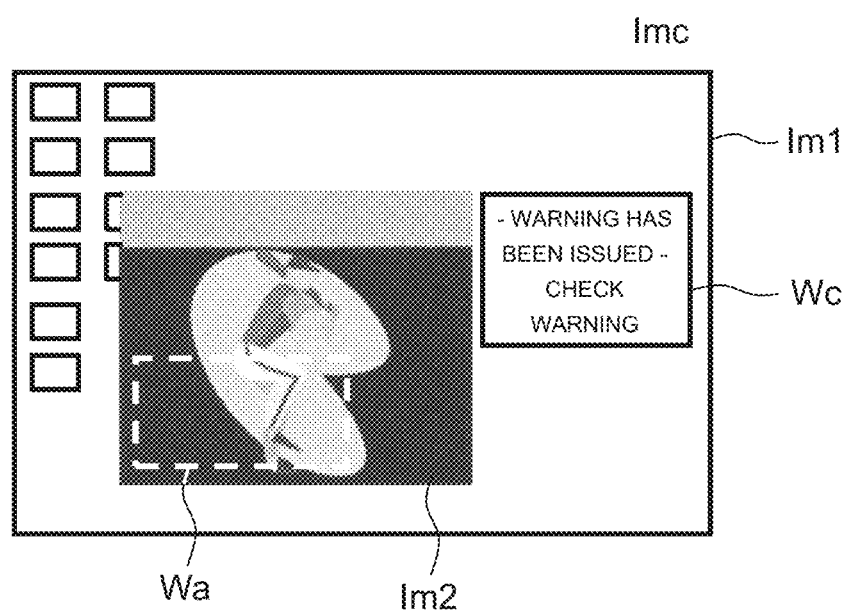
FIG. 12 illustrates a third example of a display screen of the electronic device according to the first exemplary embodiment on which a display form of a synthetic image has been changed.

FIG. 12 illustrates a third example of a display screen of electronic device 100 according to the first exemplary embodiment on which a display form of a synthetic image has been changed. In the third example, external image controller 210B and main controller 210A, i.e., controller 210C displays, at a position that does not overlap second image Im2, caution window Wc for cautioning that warning window Wa has been displayed. Specifically, external image controller 210B finds a position (coordinate) of the caution window that does not overlap second image Im2. External image controller 210B outputs, to main controller 210A, a command to generate and dispose caution window Wc at the position thus found. Then, main controller 210A generates caution window Wc and then outputs first image signal SG1 indicating first image Im1 in which generated caution window Wc is disposed at the position based on the command.

This allows a user to view new caution window Wc indicating that warning window Wa has been displayed and thus recognize that a warning has occurred.

1-2-5. Specific Example of Monitoring of Change in Color of Image Indicated by First Image Signal by External Image Controller A specific example of monitoring of a change in color of an image indicated by first image signal SG1 by external image controller 210B is described below.

External image controller 210B monitors, in every predetermined number of pixels, a change in color of an image within overlap detection region Rd in first image Im1 indicated by first image signal SG1 acquired from main controller 210A. The predetermined number of pixels is any number of pixels such as three pixels or four pixels.

Alternatively external image controller 210B monitors, in every predetermined number of frames, a change in color of an image within overlap detection region Rd in first image Im1 indicated by first image signal SG1 acquired from main controller 210A. The predetermined number of frames is any number of frames such as three frames or four frames.

Such a configuration is employed for the following reason. External image controller 210B monitors a change in color in cooperation with main controller 210A. In external image controller 210B and main controller 210A, CPU 210 executes the OS and image application. Therefore, if a change in color of all pixels within overlap detection region Rd is monitored for all frames, load of monitoring of the color in CPU 210 becomes large. This may possibly affect response of electronic device 100 and display of external input image. In view of this, the load on CPU 210 during monitoring of a change in color can be reduced by monitoring a change in color in every predetermined number of pixels or in every predetermined number of frames as described above. This makes it possible to lessen the influence on the processing for generating synthetic image Imc in external image controller 210B.

In the above case, external image controller 210B may determine whether touch panel 120 or operation button 130 has been operated by a user. When external image controller 210B determines that touch panel 120 or operation button 130 has been operated by the user, external image controller 210B may increase the predetermined number of pixels and/or the predetermined number of frames. This further reduces the load of monitoring of a color in CPU 210 while electronic device 100 is being operated by a user, thereby further lessening the influence on response of electronic device 100 or display of an external input image.

When CPU 210 has enough computing power, a change in color of all pixels within overlap detection region Rd may be monitored for all pixels and/or all frames.

1-2-6. Detection and Change of Display Form When Warning Window is Displayed in Topmost Layer by Application Other Than Image Application In some cases, app units 500A, 500B, and 500C provided by applications other than the image application dispose a warning window in a topmost layer. The detection method according to the present exemplary embodiment makes it possible to detect generation of such a warning window. When generation of a warning window is detected, a display form can be changed by employing the aforementioned first example of change of a display form (stopping superimposition of second image Im2) without the need to give a command or the like to app units 500A, 500B, and 500C.

1-3. Effects and Other Remarks

As described above, electronic device 100 according to the first exemplary embodiment includes display 110 that displays an image based on an input image signal and controller 210C that generates first image signal SG1 indicating first image Im1 under control of an operating system. Furthermore, electronic device 100 includes image superimposing unit 300B that receives first image signal SG1 and second image signal SG2 indicating second image Im2, generates synthetic image Imc in which second image Im2 is disposed on a higher-layer side of first image Im1 outside control of the operating system, and then outputs synthetic image signal SGC indicating generated synthetic image Imc to display 110. Controller 210C generates, as first image Im1, an image in which a display object is disposed in a hierarchical way and upon occurrence of the predetermined event, disposes, in a topmost layer, a first display object corresponding to warning window Wa indicating the occurrence of the predetermined event. Controller 210C generates, as first image Im1, an image in which a second display object corresponding to overlap detection window Wd is disposed in a region that is on a layer lower than the topmost layer and that is identical to a display region of second image Im2 of synthetic image Imc while image superimposing unit 300B is outputting synthetic image signal SOC to display 110, monitors a change in color of an image within the region where the overlapping second display object is disposed in first image Im1, and changes a display form of synthetic image Imc upon detection of the change in color.

In this way, while synthetic image Imc in which second image Im2 is disposed on a higher-layer side of first image Im1 is being generated outside control of the operating system, a change in color of an image within overlap detection region. Rd that is a region where the second display object corresponding to overlap detection window Wd is disposed in first image is monitored. When warning window Wa is generated, the color of the image within overlap detection region Rd changes. Accordingly, the change in color is detected. As a result, a display form of synthetic image Imc is changed so that a user can recognize occurrence of a predetermined event. This allows the user to recognize occurrence of the predetermined event.

When changing the display form, controller 210C according to the present exemplary embodiment may control image superimposing unit 300B so that an image signal indicating an image in which second image Im2 is not synthesized is output to display 110.

As a result, second image Im2 is not superimposed in synthetic image Imc. This allows a user to view warning window Wa disposed in a layer lower than second image Im2 in synthetic image Imc and thus recognize occurrence of the predetermined event.

In the present exemplary embodiment, when changing the display form, controller 210C may generate, as first image Im1, an image in which at least one of a position of second image Im2 disposed on first image Im1 and a position of warning window Wa is changed so that second image Im2 and warning window Wa do not overlap each other.

In this way, at least one of the position of second image Im2 disposed on first image Im1 and the position of warning window Wa is changed so that second image Im2 and warning window Wa do not overlap each other. This allows a user to view warning window Wa disposed in a layer lower than second image Im2 and thus recognize occurrence of the predetermined event.

In the present exemplary embodiment, when changing the display form, controller 210C may generate, as first image Im1, an image in which information indicating occurrence of the predetermined event is disposed so as not to overlap second image Im2.

This allows the user to recognize occurrence of the predetermined event.

In the present exemplary embodiment, first image Im1 is made up of a plurality of pixels. Controller 210C may monitor, in every predetermined number of pixels, a change in color of an image within overlap detection region Rd in which a second display object corresponding to detection window Wd is disposed in first image Im1.

This makes it possible to reduce load of monitoring of the color on CPU 210. Therefore, the influence on the processing for generating synthetic image Imc can be lessened.

In the present exemplary embodiment, electronic device 100 may further include an operating unit that corresponds to at least one of touch panel 120 and operation button 130 that accept a user's operation on electronic device 100. Controller 210C may increase the predetermined number of pixels when the operating unit is operated.

This makes it possible to further reduce load of monitoring of the color in CPU 210 while electronic device 100 is being operated by a user.

In the present exemplary embodiment, controller 210C may monitor, in every predetermined number of frames, a change in color of an image within overlap detection region Rd in which a second display object corresponding to detection window Wd is disposed in first image Im1.

This makes it possible to reduce load of monitoring of the color on CPU 210. Therefore, the influence on the processing for generating synthetic image Imc can be lessened.

Electronic device 100 according to the present exemplary embodiment may further include an operating unit that corresponds to at least one of touch panel 120 and operation button 130 that accept a user's operation on electronic device 100. Controller 210C may increase the predetermined number of frames when the operating unit is operated.

This makes it possible to further reduce load of monitoring of the color in CPU 210 while electronic device 100 is being operated by a user.

Electronic device 100 according to the present exemplary embodiment may further include external input terminal 140 that receives an image signal. Second image Im2 may be an image indicated by an image signal that is input via external input terminal 140.

With this configuration, the aforementioned effect can be obtained when an externally supplied image is displayed on display 110.

In the present exemplary embodiment, controller 210C may include a first controller corresponding to main controller 210A that operates based on the operating system and a second controller corresponding to external image controller 210B that operates based on an application program corresponding to an image application operating on the operating system. The first controller generates first image Im1 in which a display object is disposed in a hierarchical way. The second controller controls operation of image superimposing unit 300B and monitors a change in color of an image within overlap detection region Rd in which a second display object corresponding to detection window Wd is disposed in first image Im1.

With the configuration, the aforementioned effect can be obtained by using an application program operating on the operating system.

In the present exemplary embodiment, the second controller may transmit positional information indicating a position where the second display object is disposed to the image superimposing unit, and the image superimposing unit may generate a synthetic image in which a second image is synthesized at a position corresponding to the positional information.

This makes it possible to superimpose the second image on the position where the second display object is disposed.

In the present exemplary embodiment, the second controller may transmit a command to change a display form to at least one of the image superimposing unit and the first controller.

This makes it possible to change the display form of the synthetic image.

A method for controlling electronic device 100 according to the present exemplary embodiment includes: generating, as first image Im1, an image in which a display object is disposed in a hierarchical way; disposing, in a topmost layer, a display object indicating occurrence of a predetermined event upon occurrence of the predetermined event; generating synthetic image Imc in which second image Im2 is disposed on a higher-layer side of first image Im1 outside control of the operating system; generating, as first image Im1, an image in which overlap detection window Wd is disposed in a region that is on a layer lower than the topmost layer and that is identical to a display region of the second image of synthetic image Imc; monitoring a change in color of an image within the region where overlap detection window Wd is disposed in first image Im1; and changing, upon detection of the change in color, a display form of synthetic image Imc.

In this way, while synthetic image Imc in which second image Im2 is disposed on a higher-layer side of first image Im1 is being generated outside control of the operating system, a change in color of an image within overlap detection region. Rd that is a region where the second display object corresponding to overlap detection window Wd is disposed in first image Im1 is monitored. When warning window Wa is generated, the color of the image within overlap detection region Rd changes. Accordingly, the change in color is detected. As a result, a display form of synthetic image Imc is changed so that a user can recognize occurrence of a predetermined event. This allows the user to recognize occurrence of a predetermined event.

Other Exemplary Embodiments

The first exemplary embodiment has been described above as an illustrative example of the technique disclosed herein. However, the technique disclosed herein is not limited to this and is also applicable to exemplary embodiments in which appropriate changes, substitutions, additions, omissions, and the like have been made. A new exemplary embodiment may be created by combining constituent elements described in the first exemplary embodiment.

Other exemplary embodiments are described below.

In the first exemplary embodiment, second image Im2 is an image indicated by an external image signal that is input via, external input terminal 140. However, in the present disclosure, second image Im2 may be an image indicated by an image signal recorded on an image recording medium provided in electronic device 100. In this case, storage 220 may be used as the image recording medium. As a result, the various effects described in the first exemplary embodiment can be obtained even when an image recorded in electronic device 100 is displayed on display 110.

In the first exemplary embodiment, overlap detection window Wd (second display object) is a window colored in a single color. However, overlap detection window Wd need not be a window colored in a single color. For example, overlap detection window Wd may be a taken picture or may be a still image such as a design pattern. In this case, it is only necessary to compare an image displayed within overlap detection window Wd and an image within overlap detection region Rd in first image Im1 acquired from main controller 210A after start of display of second image Im2 and then determine whether these images differ from each other. Presence of a difference between the images means that a predetermined display object such as warning window Wa is disposed on a higher-layer side of overlap detection window Wd. It is therefore possible to detect that a predetermined display object such as warning window Wa is disposed on a higher-layer side of overlap detection window Wd.

In the first exemplary embodiment, the first display object is warning window Wa. However, in the present disclosure, the first display object only needs to be a display object displayed in a topmost display layer managed by the OS. Typically, an important message is displayed in the topmost display layer.

In the first exemplary embodiment, occurrence of a predetermined event is occurrence of a state where a warning should be given. However, in the present disclosure, occurrence of a predetermined event only need to be occurrence of a state where the first display object should be displayed in the topmost display layer managed by the OS.

In the first exemplary embodiment, an example in which whole warning window Wa is completely hidden by second image Im2. However, according to the technique disclosed herein, a change in color caused by overlap between first image Im1 and second image Im2 can be detected even when only part of warning window Wa is completely hidden by second image Im2. This therefore enables a display form to be changed as in the first exemplary embodiment.

In the first exemplary embodiment, an example in which second image Im2 is superimposed on part of first image Im1 has been described. However, according to the technique disclosed herein, a change in color caused by overlap between first image Im1 and second image Im2 can be detected even when second image Im2 has a region that is completely identical to first image for example, when second image Im2 is displayed on the whole display region of display 110. This therefore enables a display form to be changed as in the first exemplary embodiment. In such a case of full-screen display, the effects cannot be obtained by the second and third examples of change of a display form, and therefore the first example may be employed. Alternatively, controller 210C and image superimposing unit 300B may be configured so that a warning message can be displayed on second image Im2 upon detection of a change in color. Alternatively, full-screen display may be temporarily terminated, and second image Im2 may be displayed at a position that does not overlap warning window Wa.

In the first exemplary embodiment, electronic device 100 is a tablet computer. However, an electronic device according to the present disclosure may be an electronic device such as a notebook computer, a desktop computer, or a smartphone.

Electronic device 100 according to the present exemplary embodiment may further include an image recording medium on which an image signal is recorded. Second image Im2 may be an image indicated by an image signal recorded on the image recording medium.

With the configuration, the aforementioned effect can be obtained when an image recorded on the image recording medium is displayed on display 110.

The first exemplary embodiment and other exemplary embodiments have been described above as illustrative examples of the technique disclosed herein. The attached drawings and the detailed description have been provided for this purpose.

The constituent elements described in the attached drawings and the detailed description may include not only constituent elements that are essential for solution to the problems, but also constituent elements that are not essential to solution of the problems to illustrate the technique. Therefore, it should not be acknowledged that such constituent elements that are not essential are essential only because these constituent elements are described in the attached drawings and the detailed description.

Since the above exemplary embodiments are illustrative examples of the technique disclosed herein, various changes, substitutions, additions, omissions, and the like can be made within the scope of the claims or equivalents thereof.

The present disclosure is widely applicable to an electronic device that is capable of displaying an image in which a second image is superimposed on a first image.

What is claimed is:

1. An electronic device comprising:
a display that displays an image based on an input image signal;
a controller that generates a first image signal indicating a first image under control of an operating system; and
an image superimposing circuit that receives the first image signal and a second image signal indicating a second image, generates a synthetic image in which the second image is disposed on a higher-layer side of the first image outside control of the operating system, and then outputs a synthetic image signal indicating the generated synthetic image to the display,
wherein
the controller generates, as the first image, an image in which a display object is disposed in a hierarchical way and upon occurrence of a predetermined event, disposes, in a topmost layer, a first display object indicating occurrence of the predetermined event, and
while the image superimposing circuit is outputting the synthetic image signal to the display, the controller generates, as the first image, an image in which a second display object is disposed in a region that is on a layer lower than the topmost layer and that is identical to a display region of the second image of the synthetic image, monitors a change in color of an image within the region where the second display object is disposed in the first image, and upon detection of the change in color, changes a display form of the synthetic image.

2. The electronic device according to claim 1, wherein when changing the display form, the controller controls the image superimposing circuit so that an image signal indicating an image in which the second image is not synthesized is output to the display.

3. The electronic device according to claim 1, wherein when changing the display form, the controller generates, as the first image, an image in which at least one of a position of the second image disposed on the first image and a position of the first display object is changed so that the second image and the first display object do not overlap each other.

4. The electronic device according to claim 1, wherein when changing the display form, the controller generates, as the first image, an image in which information indicating occurrence of the predetermined event is disposed so as not to overlap the second image.

5. The electronic device according to claim 1, wherein the first image is made up of a plurality of pixels, and the controller monitors, in every predetermined number of pixels, the change in color of the image within the region where the second display object is disposed in the first image.

6. The electronic device according to claim 5, further comprising an operating circuit that accepts a user's operation on the electronic device, wherein when the operating circuit is operated, the controller increases the predetermined number of pixels.

7. The electronic device according to claim 1, wherein the controller monitors, in every predetermined number of frames, the change in color of the image within the region where the second display object is disposed in the first image.

8. The electronic device according to claim 7, further comprising an operating circuit that accepts a user's operation on the electronic device, wherein when the operating circuit is operated, the controller increases the predetermined number of frames.

9. The electronic device according to claim 1, further comprising an external input terminal that receives the image signal, wherein the second image is an image indicated by the image signal that is input via the external input terminal.

10. The electronic device according to claim 1, further comprising an image recording medium on which the image signal is recorded, wherein the second image is an image indicated by the image signal recorded on the image recording medium.

11. The electronic device according to claim 1, wherein the controller includes a first controller that operates based on the operating system, and a second controller that operates based on an application program operating on the operating system, the first controller generates the first image in which the display object is disposed in a hierarchical way, and the second controller controls operation of the image superimposing circuit and monitors the change in color of the image within the region where the second display object is disposed in the first image.

12. The electronic device according to claim 11, wherein the second controller transmits positional information on a position where the second display object is disposed to the image superimposing circuit, and the image superimposing circuit generates a synthetic image in which the second image is superimposed at a position corresponding to the positional information.

13. The electronic device according to claim 12, wherein the second controller transmits a command to change the display form to at least one of the image superimposing circuit and the first controller.

* * * * *